UNITED STATES PATENT OFFICE.

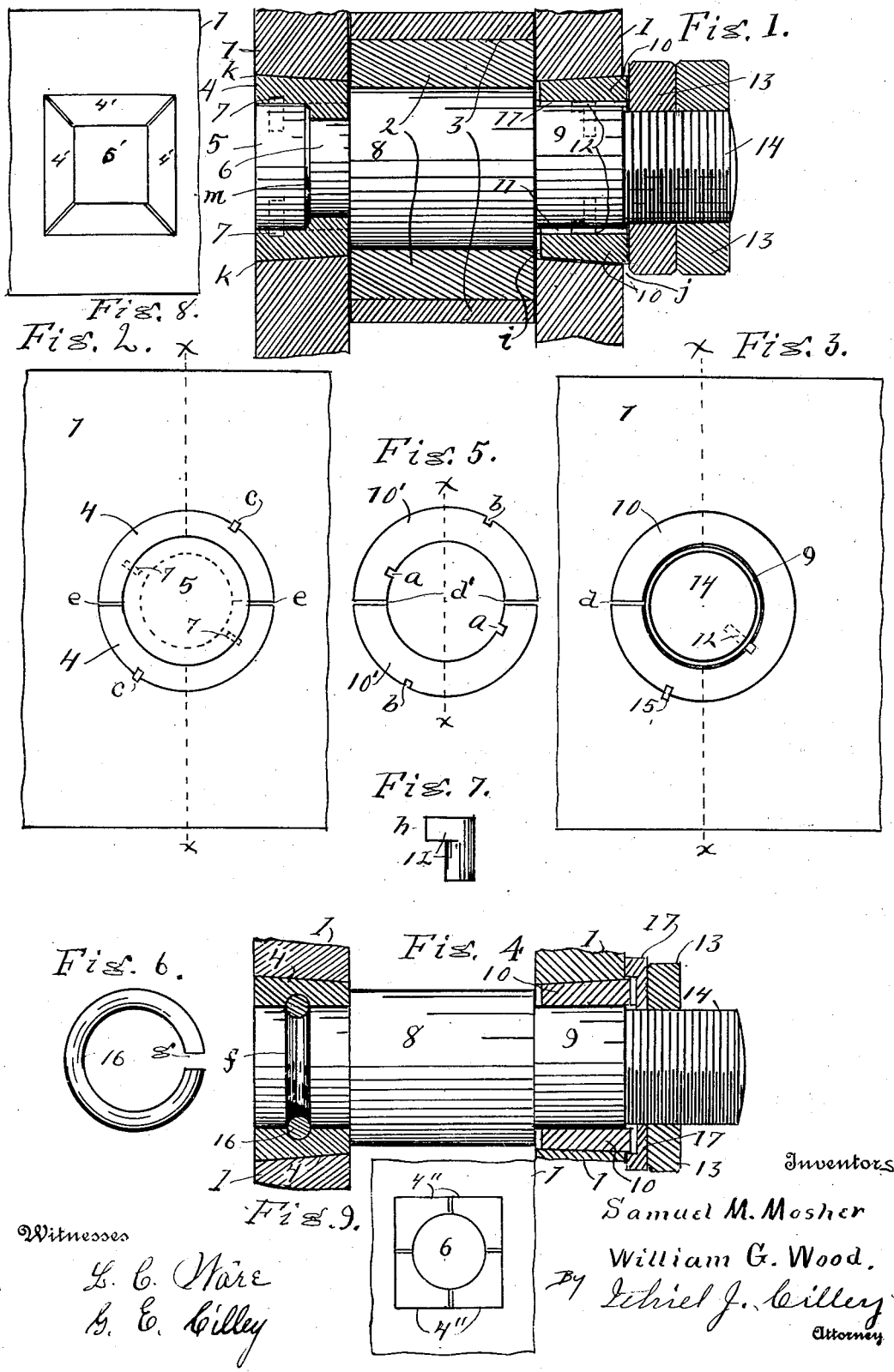

SAMUEL M. MOSHER AND WILLIAM G. WOOD, OF GRAND RAPIDS, MICHIGAN.

CROSS-HEAD PIN.

1,131,073.   Specification of Letters Patent.   Patented Mar. 9, 1915.

Application filed August 5, 1914. Serial No. 855,308.

*To all whom it may concern:*

Be it known that we, SAMUEL M. MOSHER and WILLIAM G. WOOD, citizens of the United States, residing at Grand Rapids, in the county of Kent and State of Michigan, have invented certain new and useful Improvements in Cross-Head Pins, of which the following is a specification.

Our invention relates to improvements in cross head pins for use on locomotives, and its objects are: First, to provide a means whereby the pin may be drawn from the cross head toward the workman after the retaining nuts have been removed. Second, to provide a means whereby the pin may be held absolutely proof from becoming and remaining loose in the cross head, and third, to provide a means whereby it will be impossible for the pin to turn in its bearings in the cross head. We attain these objects by the mechanism illustrated in the accompanying drawing, in which—

Figure 1 is a plan of a pin with the surrounding bearings shown in section on the lines $x$ $x$ of Figs. 2, 3 and 5. Fig. 2 is an elevation of a section of the cross head and the end of the pin and its connections looking to the right in Fig. 1. Fig. 3 is a like view looking from the right of Fig. 1, but with the retaining nuts removed. Fig. 4 is a plan of the pin showing a modified form for securing the retaining sleeves to the head of the pin. Fig. 5 is an elevation of a two piece ring for use on the entering or threaded end of the pin. Fig. 6 is a plan of the retaining ring shown in Fig. 4. Fig. 7 is an elevation of the retaining key or dowel that prevents the pin from turning in its bearings. Fig. 8 shows a square pin and collar, and Fig. 9 represents a round pin and square collar.

Like characters indicate similar parts throughout the several views.

In the accompanying drawing 1 represents the sides of the cross head proper. 2 represents the brasses or boxes that the pin works in. 3 is the strap by means of which the boxes are secured around the pin 8. These features are common in all cross head construction.

Our invention lies in the manner of forming the head on the pin, and of securing the pin into the cross head so it may be readily removed without the necessity of moving the cross head two or more times during the process of removing the pin. To accomplish this we make the pin of substantially the form shown in Fig. 1, having a large body or bearing portion, 8, and having the head portion formed by making a large head or bearing portion 5 and a smaller neck 6 between the head 5 and the bearing portion 8. We then construct a collar 4 made in two halves, as indicated in Fig. 2, so constructed internally as to perfectly fit outside of the head and neck, 5 and 6, as indicated in Fig. 1. The outer periphery of the collar is made tapering, and of a proper diameter to be made to fit very snugly in the tapering opening $k$ in the side of the cross head, and draw the parts $e$ $e$ so closely together as to cause the collar to clamp the head 5 and neck 6 so firmly as to positively prevent the possibility of either the collar becoming the least particle loose in its bearing in the side of the cross head 1 or the bearing on the pin becoming loose in the collar. To insure an absolutely firm and reliable bearing at the other end of the pin we insert an exactly similar collar, 10, into the side of the cross head, except that this collar is, preferably, made of a single piece of metal and is cut open at one side, as at $d$, so it may be sprung closely around the bearing 9 of the pin. This collar should be made a trifle larger in diameter than the opening in the side of the cross head so that when inserted and forced in its proper position in the side of the cross head there will be a space, as shown at $i$, between the inner end of the bushing and the body of the pin, and a space between the inner surface of the securing nut 13 and the outer surface of the side of the cross head, as at $j$, so that an absolutely firm and unyielding bearing may be insured for the pin when the nuts 13 are properly screwed in place on the threaded end 14 of the pin.

We provide for preventing any revoluble movement of the collars, either upon the bearing on the pin, or in the sides of the cross head by forming key seats or spline ways or grooves, as $a$ and $b$, in the collars and corresponding grooves in the sides of the cross head, and placing keys or splines, as 15, see Fig. 3, in the grooves between the collar 10 and the corresponding side of the cross head, and dowel formed keys, as 12, between this collar and the bearing on the pin, as indicated to the right of Fig. 1 so the collars 10 may be made to slide into their bearings and be interlocked with the supporting elements 1 and 9 so that the collars will be held against any possibility of revolubly moving in the bearings.

As the shoulder m on the bearing 5—6 prevents any possibility of endwise movement by the collar 4 the keys or dowels 7 7 are simply let into mortises in the collars 4 4, as indicated in Fig. 1.

When the form of collar shown in Fig. 3 is used at the outer end of the pin it is desirable that the keys 12 and 15 be placed upon one side of the key, as nearly together as possible, as indicated in Fig. 3, so that there will be no obstacle to the free movement of the collar when being forced to clamp firmly around the end of the pin as it is forced into the inclined opening in the side of the cross head. If, however, the form of collar shown in Fig. 5 is used it is necessary to place a pair of said keys in each half of the collar, as indicated by the key seats a and b.

In Fig. 4 we have shown a modified form of securing the collar 4 from endwise movement on the end of the pin, which consists of a spring ring 16 seated in a groove s in the end of the pin, and a corresponding groove in the inner periphery of the collar, as indicated in Fig. 4. This is shown, not as a preferred form, but simply to indicate that other forms than that shown in Fig. 1 may be successfully used for the purpose without departing from the spirit of our invention.

In ordinary cross head pins the head of the pin occupies the entire space between the lines k and k. In other words, the head 5 would include the entire metal bearing out to the lines k k, and to insert the pin, or remove it from the cross head it is necessary to remove it directly to the left, as shown in Fig. 1, and as the cross head is opposite the drivers of the locomotive, when in certain positions on the ways, it is necessary, sometimes, to move the cross heads two or three times in the removal or insertion of the pins. To overcome this difficulty and its incidental waste of time, we have, as hereinbefore stated, made a separate collar, 4 4, in two pieces, as indicated in Fig. 2, so arranged that the two pieces may be placed on the end 5—6 of the pin after the pin has been passed through the cross head from the front side thereof so the back end of the pin will pass entirely beyond the back side of the cross head, and then drawn forward into its bearing, as shown, when the collar 10 is passed over the end 14 and 9 of the pin, and into its bearing in the side of the cross head, and forced in place with the nuts 13. It will be readily understood that to remove the pin it is simply necessary to remove the nuts 13, drive the pin endwise far enough to remove the collars 4 from the end of the pin, and then draw the pin forward out of the brasses 2 and the cross head, thus enabling us to remove the pin without the necessity of moving the locomotive at all.

We prefer that the key or dowels 12 be made of the form shown in Fig. 7, the head h being designed to extend far enough out from the surface of the bearing 9 to enter into the groove or spline-ways 11 to allow the collar 10 to be easily adjusted endwise, but to prevent any revoluble movement of the collar.

In Fig. 8, 5' represents a square pin head for use in lieu of the round pin 5, and 4' 4' represents a square collar for use with the square pin, and in Fig. 9 we have shown the ordinary round pin secured by square collar 4''. When the square collar is used, whether on a round pin or a square pin, it is advisable to divide the collar into four parts as indicated in the two figures in which square collars are shown, and when the square pin head is used we find it especially desirable to divide the collar diagonally, as shown in Fig. 8, as this form may be more readily constructed and more easily adjusted to the square headed bearing 5'; but either the collar shown in Fig. 8 or Fig. 9 may be used on either form of pin head 5 or 5', so far as the manner of dividing the collar is concerned.

It will be noticed that the pins or dowels 7 7 at the left hand end of the pin in Fig. 1 are placed in holes that are drilled into the bearing 5 and the collar 4 in such a manner that they would hold the collar safely against the possibility of any longitudinal movement on its bearing, hence, if desired, this bearing could be made of the same size its entire length, as indicated by the dotted lines in Fig. 1, and the dowels 7 7 would hold the collars safely both against longitudinal and revoluble movement.

We find it very advantageous to use a counter bored washer or collar, as shown at 17, for supporting the nut so it will not act upon the sleeve 10 when drawing the pin in place to properly seat the sleeve 4 before the sleeve 10 is forced into its bearings, and after the sleeve 4 is properly and firmly set the collar 17 is removed and the nut 13 screwed directly against the collar as in Fig. 1.

What we claim as new, and desire to secure by Letters Patent of the United States, is:

1. In combination with a locomotive crosshead having conical openings through the sides; a pin made smaller than said openings and provided with a shoulder and a small bearing at each end, detached conical collars divided longitudinally and arranged to fit closely in the conical openings in the cross head, and around the small bearings at the ends of the pin, all so arranged that by forcing the pin backward a short distance the collars may be removed and the pin drawn out toward the operator.

2. In combination with the cross-head having an inwardly tapering conical opening through each side, a collar fitted into the opening in one side of the cross-head and having an offset in the inner surface, the other collar fitted into the opening in the other side of the cross-head and having a plain inner surface, a wrist pin having a large central bearing and a small bearing at each end, one of said bearings having an offset on its surface to interlock with the offset in the surface of its collar, and means connected with said wrist pin for forcing the collars firmly into the tapering openings in the cross-head to cause them to clamp the small bearings on the pin very firmly.

3. In combination with a cross-head having an inwardly tapering conical opening through each side in direct central alinement, divided annular collars fitted a trifle larger than the openings through the cross-head, a wrist pin having a large central bearing and a small bearing at each end concentric therewith, said end bearings slightly larger than the inner diameter of the collars, means for preventing longitudinal movement of the pin in the collars and means for preventing the revoluble movement of the pins or the collars in their bearings, and means for forcing the collars into the openings in the cross-head and to firmly clamp the small bearings of the pin.

4. In combination with a locomotive cross-head having concentric inwardly tapering conical openings through its sides, a wrist pin having a large central bearing and smaller end bearings concentric therewith, divided conical collars made to clamp the smaller bearings on the pin firmly and having an outside diameter slightly larger than the internal diameter of the openings through the cross-head, the collar on the back end of the pin made to interlock with, and prevent longitudinal movement of the pin, keys and corresponding keyseats in the collar, the pin and the cross-head to prevent the collars and pin from revolving in their bearings, and means for forcing the collars to a firm bearing in the cross-head and on the pin.

Signed at Grand Rapids, Michigan, August 3, 1914.

SAMUEL M. MOSHER.
WILLIAM G. WOOD.

In presence of—
  JOHN W. HILDING,
  I. J. CILLEY.